United States Patent
Wulff

(10) Patent No.: US 8,525,663 B2
(45) Date of Patent: Sep. 3, 2013

(54) WIND POWER PLANT AND METHOD FOR OPERATING OBSTACLE OR HAZARD LIGHTING OF A WIND POWER PLANT

(75) Inventor: Steffen Wulff, Bremen (DE)

(73) Assignee: Siemens Aktiengesellschaft, München (DE)

( * ) Notice: Subject to any disclaimer, the term of this patent is extended or adjusted under 35 U.S.C. 154(b) by 419 days.

(21) Appl. No.: 12/633,858

(22) Filed: Dec. 9, 2009

(65) Prior Publication Data

US 2010/0156303 A1    Jun. 24, 2010

(30) Foreign Application Priority Data

Dec. 19, 2008   (EP) .................................... 08022143

(51) Int. Cl.
*G08B 23/00*   (2006.01)
(52) U.S. Cl.
USPC ................. 340/500; 340/815.4; 340/815.65
(58) Field of Classification Search
USPC ....................................................... 340/500
See application file for complete search history.

(56) References Cited

U.S. PATENT DOCUMENTS

| | | | | |
|---|---|---|---|---|
| 2,532,988 | A * | 12/1950 | Bigelow | 244/114 R |
| 6,762,695 | B1 * | 7/2004 | Eslambolchi et al. | 340/983 |
| 6,948,830 | B1 * | 9/2005 | Petrick | 362/229 |
| 7,982,659 | B2 * | 7/2011 | Laufer | 342/61 |
| 2003/0043585 | A1 | 3/2003 | Rohlfing et al. | |
| 2005/0270181 | A1 * | 12/2005 | Wobben | 340/983 |

FOREIGN PATENT DOCUMENTS

| | | |
|---|---|---|
| CN | 1599840 A | 3/2005 |
| DE | 20008289 U1 | 9/2000 |
| DE | 10125270 A1 | 12/2002 |
| EP | 1282888 B1 | 2/2006 |

OTHER PUBLICATIONS

ELM, "Allgemeine Verwaltungsvorschrift zur Kennzeichnung von Luftfahrthindernissen", Luftrecht-Online, Apr. 2007, pp. 1-23, XP007909267.

* cited by examiner

*Primary Examiner* — Kerri McNally

(57) ABSTRACT

A method for operating obstacle or hazard lighting of a wind power plant with a red beacon unit and a white beacon unit is provided. The red beacon unit is operated 24 hours a day and the white beacon unit is switched on and off, depending on the ambient brightness.

18 Claims, 3 Drawing Sheets

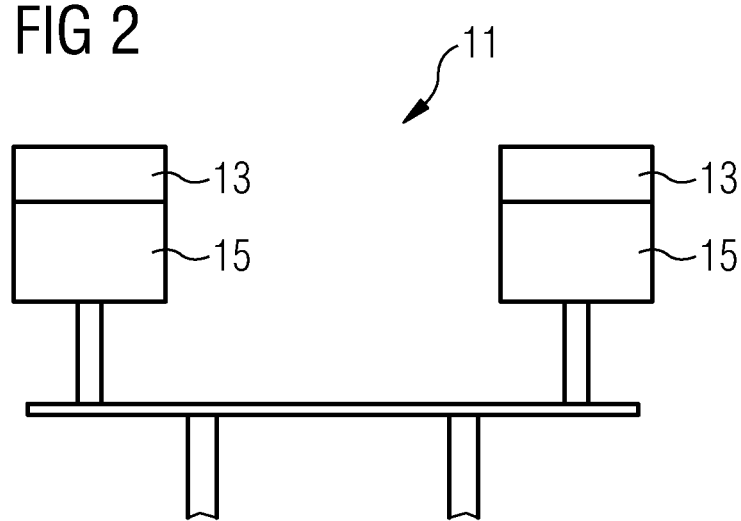
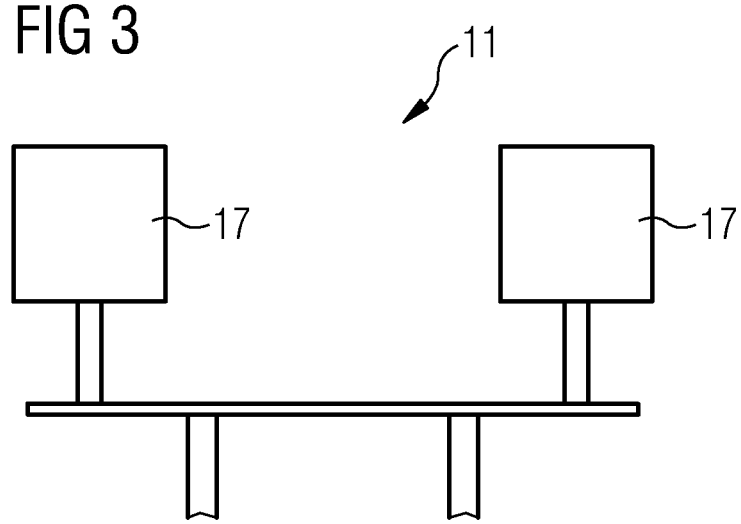

WIND POWER PLANT AND METHOD FOR OPERATING OBSTACLE OR HAZARD LIGHTING OF A WIND POWER PLANT

CROSS REFERENCE TO RELATED APPLICATIONS

This application claims priority of European Patent Office Application No. 08022143.5 EP filed Dec. 19, 2008, which is incorporated by reference herein in its entirety.

FIELD OF INVENTION

Depending on their location, structures exceeding a certain height must be equipped with obstacle or hazard lighting. In Germany, the pertinent guidelines are summarized in the "Allgemeine Verwaltungsvorschrift zur Kennzeichnung von Luftfahrthindernissen" (General Administrative Instructions on the Identification of Obstacles to Air Traffic). In particular, red lighting is provided at night. White beacon units can be operated during the day.

BACKGROUND OF INVENTION

EP 1 282 888 B1 describes a beacon system on wind power plants, which comprises equipment for the detection of brightness values in the vicinity of the lighting arrangement. A switching device is also present, which switches over from one lighting element of a first color to a differently colored lighting element when a certain brightness value is reached. It is thus possible to switch from white to red lighting at dusk and from red to white lighting during the dawn.

SUMMARY OF INVENTION

It is an object of the present invention to provide an advantageous method for operating the obstacle or hazard lighting of a wind power plant. It is a further object of the present invention to provide an advantageous wind power plant.

The first object is achieved by means of a method for operating obstacle or hazard lighting of a wind power plant, the second object by means of a wind power plant. A wind power plant can here be an individual wind turbine or a wind farm with a multiplicity of wind turbines.

In the inventive method for operating the obstacle or hazard lighting of a wind power plant, which comprises a red and white beacon unit, the red lighting is operated 24 hours a day. The white beacon unit is switched on and off depending on the ambient brightness. In the switched-on status, the white beacon unit can be operated in continuous or flashing mode within the framework of the invention. Within the framework of the invention the red beacon unit can also be operated in continuous or flashing mode.

Thus, in contrast to the prior art, according to the invention, no switching between white and red lighting takes place, but instead activation of the white beacon unit, if a certain brightness value is reached during daytime. This embodiment offers the advantage that the red beacon unit is always available, even if the white beacon unit should fail. The red beacon unit thus represents an immediately deployed backup system for the white beacon unit.

Under certain circumstances the light intensity of the red beacon unit is reduced for certain time periods. There is in particular the possibility of reducing the light intensity of the red beacon unit during daytime. This can take place either on a time-controlled basis or depending on the ambient brightness.

Alternatively or additionally, a reduction of the light intensity of the red beacon unit and/or of the white beacon unit takes place depending on the visibility in the vicinity of the wind power plant. In particular in the case of so-called "Mittelleistung" (medium output) lighting according to the aforementioned "Allgemeine Verwaltungsvorschrift zur Kennzeichnung von Luftfahrthindernissen" the possibility exits of reducing the light intensity of the lighting to 30% of the nominal intensity, if the visibility exceeds 5 km, and to 10% of the nominal intensity, if the visibility is greater than 10 km. The reduction of the lighting in the case of good visibility also contributes in particular to reducing the nuisance to local residents in the vicinity of the wind power plant stemming from the lighting. In particular in the case of the flashing beacon possible within the framework of the invention, a reduction of the light intensity can result in a higher level of acceptance of the wind power plant among local residents.

An inventive wind power plant, which can comprise either an individual wind turbine or a wind farm made up of a multiplicity of wind turbines, comprises obstacle or hazard lighting, having red and white beacon unit lamps. In addition it comprises a brightness sensor, which detects the ambient brightness in the vicinity of the wind power plant and produces a brightness signal representing the detected ambient brightness. A control device for receiving the brightness signal is connected to the brightness sensor. This is embodied to control the switching on and off of the beacon lamps at least on the basis of the brightness signal. Lighting can here basically be realized in continuous or flashing form. According to the invention, the control device is embodied in such a way that the red beacon unit is operated 24 hours a day, whether in flashing or continuous mode, and the white beacon unit is switched on and off depending on the detected ambient brightness. The white beacon unit can here basically be continuous or flashing in form.

As already described with reference to the inventive method, the red beacon unit thus functions as an emergency backup in the event of the failure of the white beacon unit.

The control device can in particular be embodied in such a way that it reduces the light intensity of the red beacon unit over certain time periods, for example depending on the detected ambient brightness. Alternatively there is also the possibility for the wind power plant to comprise a time switch, which is connected to the control unit for the transmission of a timing signal, and the control unit is embodied in such a way that it reduces the light intensity of the red beacon unit on a time-controlled basis. In this way during the day the red lighting can be reduced to the minimum level required to fulfill the backup function, thereby largely avoiding disturbance to local residents by the red lighting. Instead of being connected to the control unit connected, the time switch can also be integrated into the control unit.

The realization of a backup function of the red beacon unit is in particular possible when the wind power plant comprises a monitoring device connected to the control unit or integrated into the same, which monitors the proper functioning of the white beacon unit and in the event of improper functioning of the white beacon unit produces a fault signal. The control device is then embodied in such a way that it increases the light intensity of the red beacon unit again, if it receives a fault signal from the monitoring device, while the light intensity of the red beacon unit is reduced. In this way it is possible to prevent the intensity of the red beacon unit being insufficient to be able to perform the backup function in the event of a failure of the white beacon unit.

In a development of the inventive wind power plant, this comprises a visibility sensor, which detects the visibility in the vicinity of the wind power plant and produces a visibility signal representing the detected visibility. The control unit is then connected to the visibility sensor for reception of the visibility signal and embodied in such a way that it reduces the light intensity of the red beacon unit and/or of the white beacon unit, depending on the visibility signal received. In this way it is possible to reduce the light intensity of the lighting to the minimum required value to fulfill the indicator or warning function. In this way, acceptance of the lighting among local residents can be increased.

BRIEF DESCRIPTION OF THE DRAWINGS

Further features, characteristics and advantages of the present invention are evident from the following description of exemplary embodiments, with reference to the attached figures.

FIG. 2 shows the obstacle or hazard beacons in detail in a first variant.

FIG. 3 shows the obstacle or hazard beacons in detail in a second variant.

DETAILED DESCRIPTION OF INVENTION

Figure 1:
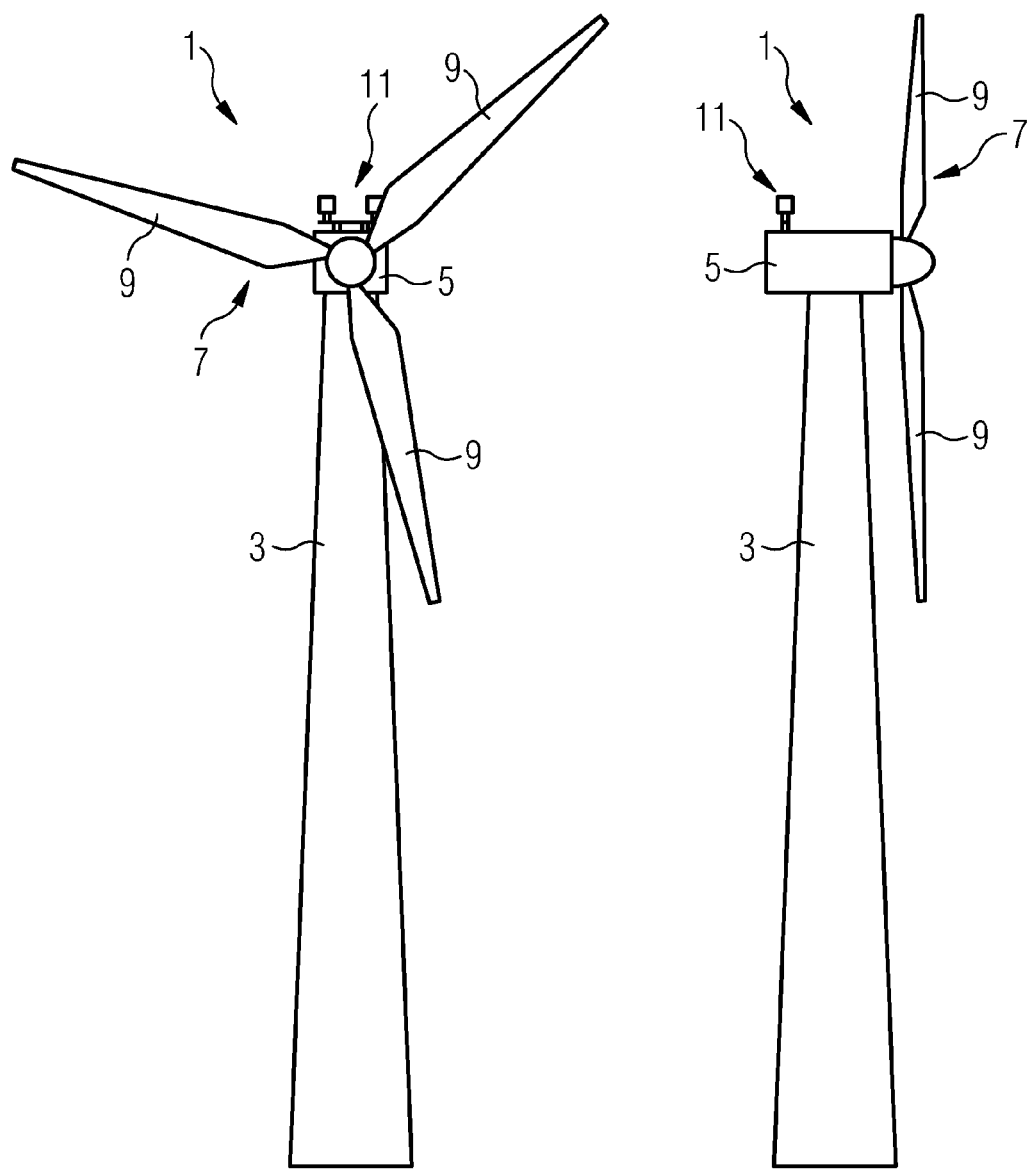
FIG. 1 shows, as an example of an inventive wind power plant, a wind turbine with obstacle or hazard beacons.

As an exemplary embodiment of an inventive wind power plant, a wind turbine with obstacle or hazard beacons is represented in schematic form in FIG. 1.

The wind turbine 1 comprises as its main components a tower 3, a nacelle 5 mounted in horizontally rotatable form on the upper end of the tower 3 and a rotor 7 mounted on the nacelle 5 and rotatable about an axis running for the most part horizontally, which in the present exemplary embodiment comprises three rotor blades 9. However the rotor 7 does not necessarily have to comprise three rotor blades 9. The number of rotor blades can instead be smaller or greater than that of the rotor 7 shown in the figure. Today, however, two-bladed rotors and in particular three-bladed rotors are mainly employed.

On the top of the nacelle 5 the wind turbine 1 has obstacle or hazard lighting 11, comprising one red and one white beacon unit. The obstacle or hazard lighting 11 is shown in detail in FIG. 2. It comprises in total four lighting bodies, specifically two red lighting bodies 13, which form the red beacon unit, and two white beacon unit bodies 15, which form the white beacon unit. In particular lighting bodies made up of one or more LEDs can here be considered as lighting bodies. Depending on requirements, these are either in continuous or in flashing mode. Whether pulsing or flashing operation is employed, is here determined according to the provisions applying in each case. In addition red and/or white beacon lighting bodies of the obstacle or hazard lighting 11 can be arranged on the tower 3, if the pertinent provisions require this.

An alternative variant of the obstacle or hazard lighting 11 is represented in FIG. 3. In contrast to the variant represented in FIG. 2, only two lighting bodies 17 are present, which are suitable both for the emission of white light and of red light.

A first variant for operation of the obstacle or hazard lighting 11 is described in the following with reference to FIG. 4, which shows a block diagram of the control for the obstacle or hazard lighting 11. In the block diagram the red and white lighting bodies 13, 15 are represented in schematic form. They are connected to a control unit 19, to which a brightness sensor 21 is also connected, which is arranged on the wind power plant 1 in such a way that it can detect the brightness in the vicinity of the wind power plant 1. The brightness sensor 21 produces a brightness signal representing the detected ambient brightness, which is output to the control unit 19. On the basis of the brightness signal received, the white beacon unit 15 is activated during the day, that is when the detected ambient brightness exceeds a particular value, and switched off at night, that is when the detected ambient brightness falls below a prescribed threshold value. The red beacon unit 13 on the other hand is controlled in such a way that it is switched on 24 hours a day. In the present exemplary embodiment, however, the control unit 19 reduces the light intensity of the red beacon unit 13, when the white beacon unit 15 is switched on. When in the evening the white beacon unit is switched off, the light intensity of the red beacon unit is increased once more. The reduction and increasing of the light intensity of the red beacon unit 13 can take place on the basis of the same brightness signal as the switching on and off of the white beacon unit 15.

Figure 5:
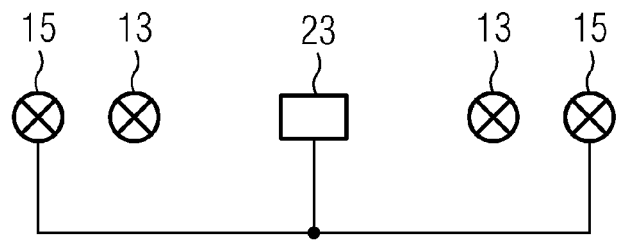
FIG. 5 shows a second variant for control of the obstacle or hazard beacons as a circuit diagram.

A simplified variant for control of the obstacle or hazard lighting 11 is shown in FIG. 5. In this variant only one dusk sensor 23 is present, which is connected to the white beacon unit 15 and switches the white beacon unit 15 on, when a switching threshold of 50 to 100 Lux is exceeded, and switches off the white beacon unit 15, when the level falls below a switching threshold of 50 to 100 Lux. In this exemplary embodiment on the other hand the red beacon unit 13 is operated with the same light intensity during the day and the night.

Figure 6:
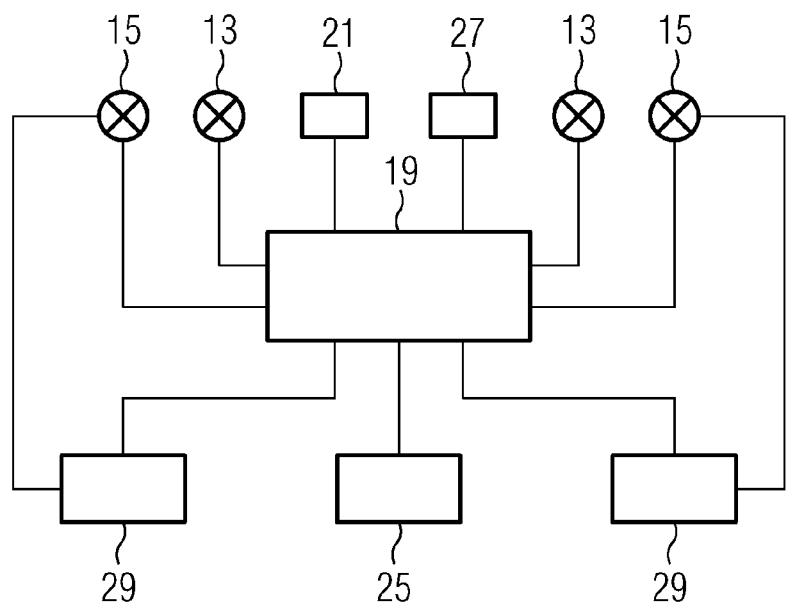
FIG. 6 shows a third variant for control of the obstacle or hazard beacons as a circuit diagram.

A third exemplary embodiment for control of the obstacle or hazard lighting 11 is represented in FIG. 6. Compared with the embodiment represented in FIG. 4 a time switch 25 and a visibility sensor 27 are additionally connected to the control unit 19. In the present exemplary embodiment the time switch 25 undertakes reduction in the light intensity of the red beacon unit. A reduction of the luminosity can thereby be effected independently of the detected brightness, for example when the disturbance of local residents by the red beacon unit is to be expected only at particular times of day.

The visibility in the vicinity of the wind power plant is determined by means of the visibility sensor 27. The visibility sensor 27 produces a visibility signal representing the detected visibility, which is output to the control unit 19. If the visibility exceeds a certain visibility threshold, the light intensity is reduced in the present exemplary embodiment. If it is night time, the light intensity of the red beacon unit 13 is hereby reduced, if it is daytime the light intensity of the white beacon unit 15 and, if applicable, red beacon unit 13 is reduced, if this is not anyway reduced during daytime. In particular the reduction can take place in stages, if a number of visibility thresholds are present. It is thus possible, for example, to reduce the light intensity of the red and/or the white beacon unit to 30% of the nominal output, if the detected visibility exceeds 5000 m, and to 10% of the nominal output if the detected visibility exceeds 10,000 m.

Furthermore the exemplary embodiment shown in FIG. 6 comprises two monitoring devices 29, which are connected to the white beacon unit 15 for monitoring of proper functioning. In addition the two monitoring devices 29 are connected to the control unit 19. If one of the monitoring devices 29 detects a malfunction of the white beacon unit 15 it monitors, it transmits a fault signal to the control unit 19, which there-upon increases the light intensity of the corresponding red beacon unit 13, if this is reduced, when the malfunctioning of the white beacon unit is established. Instead of two separate monitoring devices 29, each of which monitors one of the white lighting elements, it is also possible to provide one single monitoring device, which monitors several or all white lighting elements 15.

The control unit 19, the time switch 25 and the monitoring units 29 can be realized either in the form of hard-wired hardware or in the form of programs installed on a universal hardware unit.

Figure 4:
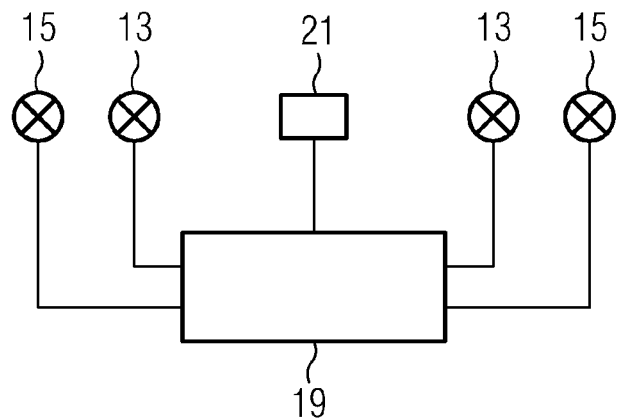
FIG. 4 shows a first variant for controlling of the obstacle or hazard beacons as a block diagram.

It is further possible, in the case of a wind farm, to provide each wind turbine 1 individually with one of the controllers represented in the FIGS. 4 to 6. Alternatively the possibility also exists to combine several or all wind turbines of the wind farm and provide them with a shared controller according to one of the exemplary embodiments.

The invention claimed is:

1. A method for operating obstacle or hazard lighting of a wind power plant, comprising:
   providing a red beacon unit and a white beacon unit;
   operating the red beacon unit 24 hours a day, wherein the red beacon unit is controlled such that the red beacon unit is switched on 24 hours a day; and
   switching on and off the white beacon unit depending on ambient brightness,
   wherein a light intensity of the red beacon unit is reduced over certain time periods.

2. The method as claimed in claim 1, wherein a reduction of the light intensity of the red beacon unit takes place on a time-controlled basis.

3. The method as claimed in claim 1, wherein a control of a reduction of the light intensity of the red beacon unit takes place depending on the ambient brightness.

4. The method as claimed in claim 2, wherein a control of the reduction of the light intensity of the red beacon unit takes place depending on the ambient brightness.

5. The method as claimed in claim 1, wherein the light intensity of the red beacon unit increases when a light intensity of the white beacon unit diminishes to an unplanned degree, while the light intensity of the red beacon unit is reduced.

6. The method as claimed in claim 1, wherein a reduction of the light intensity of the red beacon unit takes place depending on a visibility in a vicinity of the wind power plant.

7. The method as claimed in claim 1, wherein a reduction of a light intensity of the white beacon unit takes place depending on a visibility in a vicinity of the wind power plant.

8. The method as claimed in claim 1, wherein a reduction of a light intensity of the red beacon unit and the white beacon unit takes place depending on a visibility in a vicinity of the wind power plant.

9. The method as claimed in claim 1, wherein the obstacle or hazard lighting takes place in a flashing manner.

10. A wind power plant, comprising:
    obstacle or hazard lighting including red beacon lamps and white beacon lamps;
    a brightness sensor detecting an ambient brightness in a vicinity of the wind power plant and producing a brightness signal representing a detected ambient brightness; and
    a control device connected to the brightness sensor for receiving the brightness signal, the control device being configured to control a switching on and off of the beacon lamps based upon the brightness signal,
    wherein the control device is configured such that the red beacon unit is switched on 24 hours a day and the white beacon unit is switched on and of depending on the detected ambient brightness, and
    wherein the control device is configured such that a light intensity of the red beacon unit is reduced over certain time periods by the control device.

11. The wind power plant as claimed in claim 10, wherein the control device is configured such that the light intensity of the red beacon unit is reduced by the control device depending on the detected ambient brightness.

12. The wind power plant as claimed in claim 10, further comprising:
    a time switch connected to the control device for transmitting a time signal, wherein the control device is configured such that the light intensity of the red beacon unit is reduced on a time-controlled basis.

13. The wind power plant as claimed in claim 12, wherein the time switch is integrated into the control device.

14. The wind power plant as claimed in claim 11, further comprising:
    a time switch connected to the control device for transmitting a time signal, wherein the control device is configured such that the light intensity of the red beacon unit is reduced on a time-controlled basis.

15. The wind power plant as claimed in claim 14, wherein the time switch is integrated into the control device.

16. The wind power plant as claimed in claim 10, further comprising:
    a monitoring device connected to the control device, the monitoring device monitoring a proper functioning of the white beacon unit,
    wherein the monitoring device produces a fault signal in case of improper functioning of the white beacon unit, and
    wherein the control device increases the light intensity of the red beacon unit once more upon receiving the fault signal from the monitoring device.

17. The wind power plant as claimed in claim 16, wherein the monitoring device is integrated into the control device.

18. The wind power plant as claimed in claim 10, further comprising:
    a visibility sensor detecting a visibility in a vicinity of the wind power plant and producing a visibility signal representing a detected visibility,
    wherein the control device is connected to the visibility sensor for receiving the visibility signal, and
    wherein the control device reduces the light intensity of the red beacon unit or of the white beacon unit depending on the visibility signal received.

* * * * *